United States Patent
Adrian et al.

[11] 3,913,104
[45] Oct. 14, 1975

[54] INCOHERENT SPECTRAL COMPARISON FUZE SYSTEM WITH HYBRID AGC

[75] Inventors: Donald J. Adrian, Arlington; Carlton H. Cash, Norco, both of Calif.

[73] Assignee: The United States of America as represented by the Secretary of the Navy, Washington, D.C.

[22] Filed: Feb. 17, 1959

[21] Appl. No.: 793,936

[52] U.S. Cl. ............. 343/7 PF; 102/70.2 P; 343/14
[51] Int. Cl.² ........................................... G01S 9/24
[58] Field of Search ............... 343/7, 14; 102/70.2 P

[56] References Cited
UNITED STATES PATENTS

| | | | |
|---|---|---|---|
| 2,842,764 | 7/1958 | Harvey | 343/14 |
| 2,907,023 | 9/1959 | Skinner | 343/14 |
| 3,614,782 | 10/1971 | Adrian | 343/7 PF |
| 3,719,944 | 3/1973 | Adrian | 343/7 PF |
| 3,821,737 | 6/1974 | Kalmus | 343/7 PF |

*Primary Examiner*—Maynard R. Wilbur
*Assistant Examiner*—G. E. Montone
*Attorney, Agent, or Firm*—Richard S. Sciascia; Joseph M. St.Amand; T. M. Phillips

EXEMPLARY CLAIM

2. An FM fuze system comprising a source of band limited noise, an RF transmitter coupled to a source of band limited noise for transmitting a random noise modulated signal in the direction of a target, receiving means for receiving a return echo of said transmitted signal, a mixer circuit having a first and second input coupled to said transmitter and to said receiving means for producing an output signal containing coherent and incoherent signals, first amplifier intergrator circuit means coupled to said mixer circuit means for accepting a first band of frequencies within said incoherent portion of said mixer output signal and producing an output voltage proportional to the average amplitude of said first band of frequencies, second amplifier intergrator circuit means coupled to said mixer circuit for accepting a second band of frequencies within said incoherent portion of said mixer output signal and producing an output voltage proportional to the average amplitude of said second band of frequencies, difference amplifier means coupled to said first and second circuit means for producing an output signal proportional to the difference of the amplitudes of the output signals of said first and second amplifier integrator circuits.

2 Claims, 4 Drawing Figures

INVENTORS
DONALD J. ADRIAN
CARLTON H. CASH

INVENTORS
DONALD J. ADRIAN
CARLTON H. CASH
BY

INCOHERENT SPECTRAL COMPARISON FUZE SYSTEM WITH HYBRID AGC

The invention described herein may be manufactured and used by or for the Government of the United States of America for governmental purposes without the payment of any royalties thereon or therefor.

This invention relates to a fuze system and more particularly an FM spectral comparison fuze system wherein the transmitted carrier is frequency modulated by a band limited random noise and mixed with the return echo signal from a target. A flat controllable range response is obtained by comparing two bands of incoherent noise from the mixer output and using an automatic gain control feed back scheme to produce a range response positive for in range targets and negative for out-of-range targets.

In prior FM fuze systems, a sinusoidal frequency modulation has been used to give some range attenuation but the cutoff is very poor and ambiguous due to the periodic modulation.

Another FM system disclosed in the application of Thomas B. Whiteley and Donald J. Adrian for a Fuze System, Ser. No. 566,318, filed Feb. 17, 1956, the transmitted carrier is frequency modulated by a band limited random noise to provide rapid unambiguous range cutoff in the doppler signal obtained by mixing a portion of the transmitted signal with the returned echo signal and passing the mixed signal through a low pass filter which transmits the doppler frequency output used to trigger the fuze. The disadvantage of this system is that the receiver bandwidth must be narrow in order to get good range cutoff. When FM fuze systems are used in missiles with high closing velocities with a target, wide receiver band widths are needed to accept the expected range of doppler frequencies. Therefore, in an operational systems where the receiver bandwidth has to be wide enough to accept the expected range of doppler frequencies there is an undesirable incoherent power component known as range noise that limits the range cutoff of the Whiteley and Adrian system since the magnitude of this incoherent signal component becomes greater with the increased bandwidth and with an increase of range such as in missiles with a nuclear war-head.

The present invention is similar to the system disclosed in the Whiteley and Adrian application in that the transmitted carrier is frequency modulated by band limited white noise and the transmitted signal is mixed with the returned echo signal from the target that is phase modulated due to the relative movement between the missile and target. This invention differs from the Whiteley and Adrian in that the output from the mixer is divided and passed through two amplifier-integrator circuits with their center frequencies above the coherent (doppler) band. The two bands of incoherent signals are detected and integrated and their envelopes are fed to a difference amplifier with an AGC network connecting one of the amplifiers and the difference amplifier whereby the output from the difference amplifier has a range response that is large and positive for in-range targets and small and negative for out-of-range targets.

It is an object, therefore, of the present invention to provide an FM fuze system for a missile having high closing velocities with a target.

A further object of the invention is to provide an FM fuze system operable against range noise due to wide receiver bandwidth.

Another object of the invention is to provide a noise modulated FM fuze system having a flat controllable range response covering an appreciable distance.

A still further object of the invention is to provide a radio fuze system which will function within a predetermined range with no adverse effect due to large return signals from large out-of-range reflectors.

Another object of the invention is to provide an FM fuze system having an absolute range cutoff.

A further object of the invention is to provide a fuze system capable of discriminating against electronic countermeasures.

A still further object of the invention is to provide a fuze system that is insensitive to large low level intercepts such as sea return.

Other objects and many of the attendant advantages of this invention will be readily appreciated as the same becomes better understood by reference to the following detailed description when considered in connection with the accompanying drawings wherein.

Figure 1:
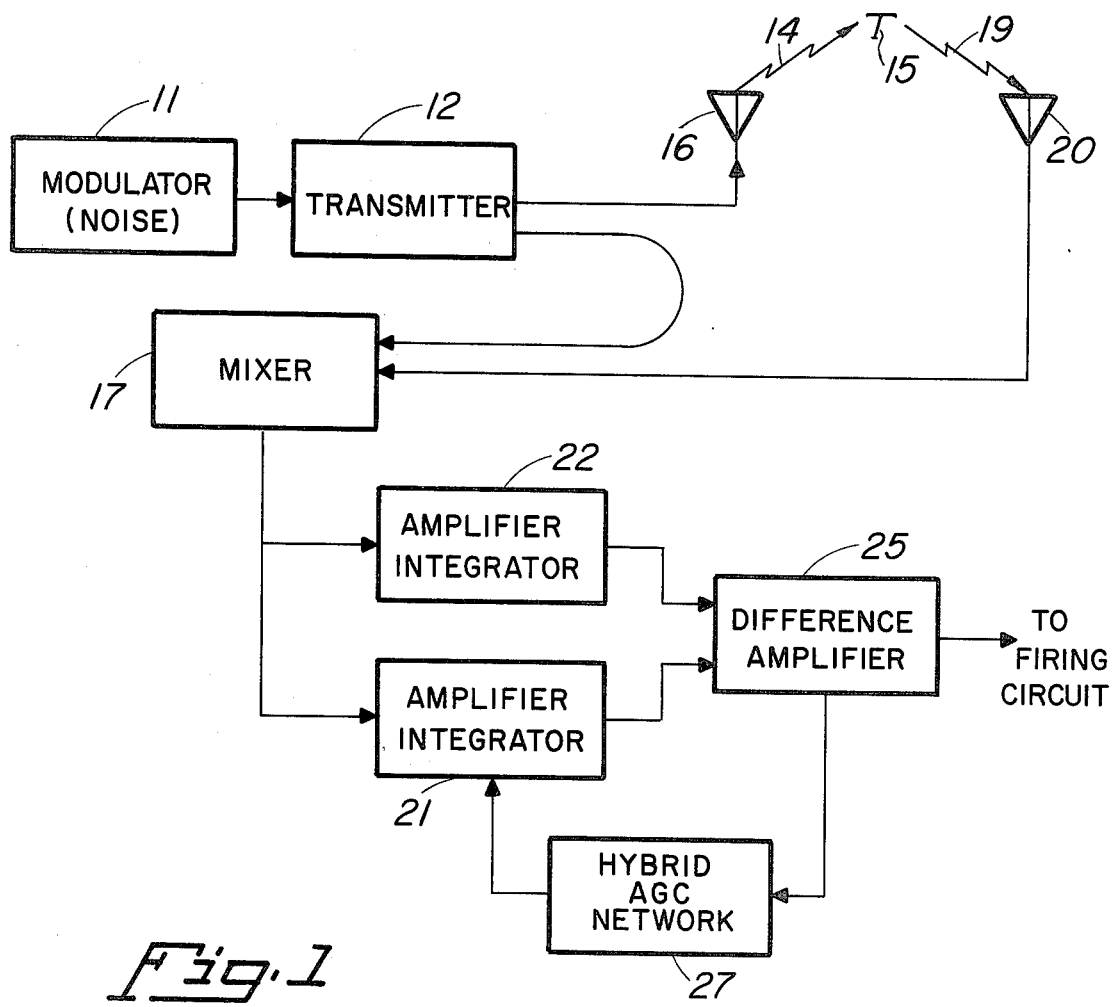
FIG. 1 is a block diagram illustrating one preferred embodiment of the present invention.

Referring now to the drawings and more particularly to the preferred embodiment shown in FIG. 1 which is assumed to be mounted in a moving missile which in turn is guided on a path to approach a target with the RF energy from the fuze being transmitted toward the target and a return echo signal being received therefrom, the block 11 represents a source of band limited white noise which is used to frequency modulate the RF carrier frequency in the transmitter 12. The transmitter 12 transmits a noise modulated FM signal 14 in the direction of the target T through the antenna 16. A portion of the transmitted energy from the transmitter 12 is applied to the balanced mixer 17 where it is combined with the return echo signal 19 from the target T which has been modified by the Doppler effect of the relative movement between the missile and target and is received through the antenna 20 and applied to the mixer 17.

The output from the mixer 17 comprises a spectrum of coherent Doppler wave portion plus an incoherent portion due to range noise. In order to obtain a range response that includes a zero amplitude at zero range it is necessary to use bands of received range noise that have frequencies above the expected doppler frequencies. The output from the mixer 17 is divided and passed through the amplifier-integrators 21 and 22 where the amplifiers are both tuned to amplify a band of signals outside the coherent (doppler) region with the center frequency of amplifier 22 further removed from the coherent (doppler) band than amplifier 21 and the amplifier-integrators 21 and 22 have different center frequencies with the exact spread of frequencies depending upon the type of range response desired from each amplifier-integrator. The signals thus amplified are detected and integrated to obtain envelopes 23 and 24. Since the center frequencies of amplifier integrators 21 and 22 are both tuned to amplify signals above the coherent region and the center frequency of amplifier 22 is further removed from the coherent band than amplifier 21, amplifiers 21 and 22 will start conducting at different values of $D\tau$ (FIG. 2), where D is RMS frequency deviation and $\tau$ is the round trip time of a signal reflected from target, T. Curves 23 and 24 are representative outputs of tuned amplifiers when plotted against a frequency variable. The envelopes 23 and 24 of the amplifierintegrators 21 and 22 signals respectively are passed to the difference amplifier 25 where the envelope 24 is subtracted from the envelope 23 to give an output 26 representing the range response of the fuze system. The terms "coherent" and "incoherent" are used herein in their conventional radar terminology meaning, i.e., Coherent: composed of interdependent or related parts having a congruity arising from a common relationship; and, Incoherent: composed of independent or unrelated parts having no congruity or predictable relationship.

Figure 2:
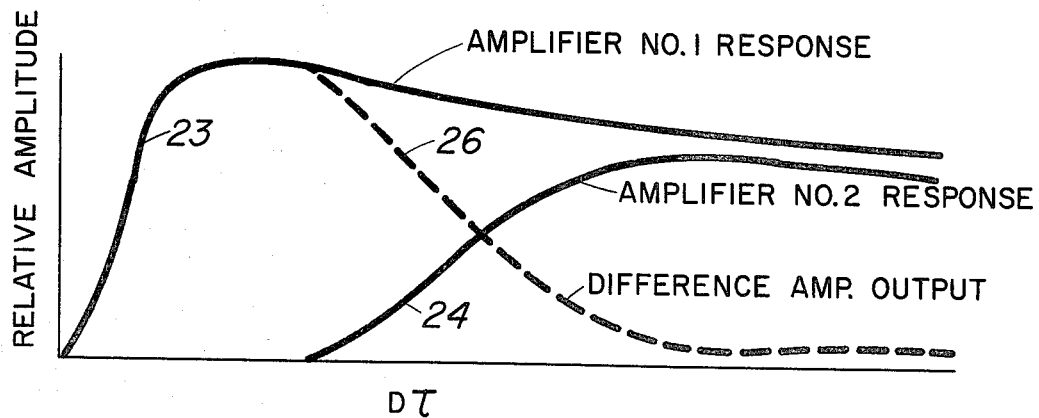
FIG. 2 is a diagram illustrating the relative amplitude of the two integrated amplifier range response curves when the amplifiers have equal gain.
Figure 3:
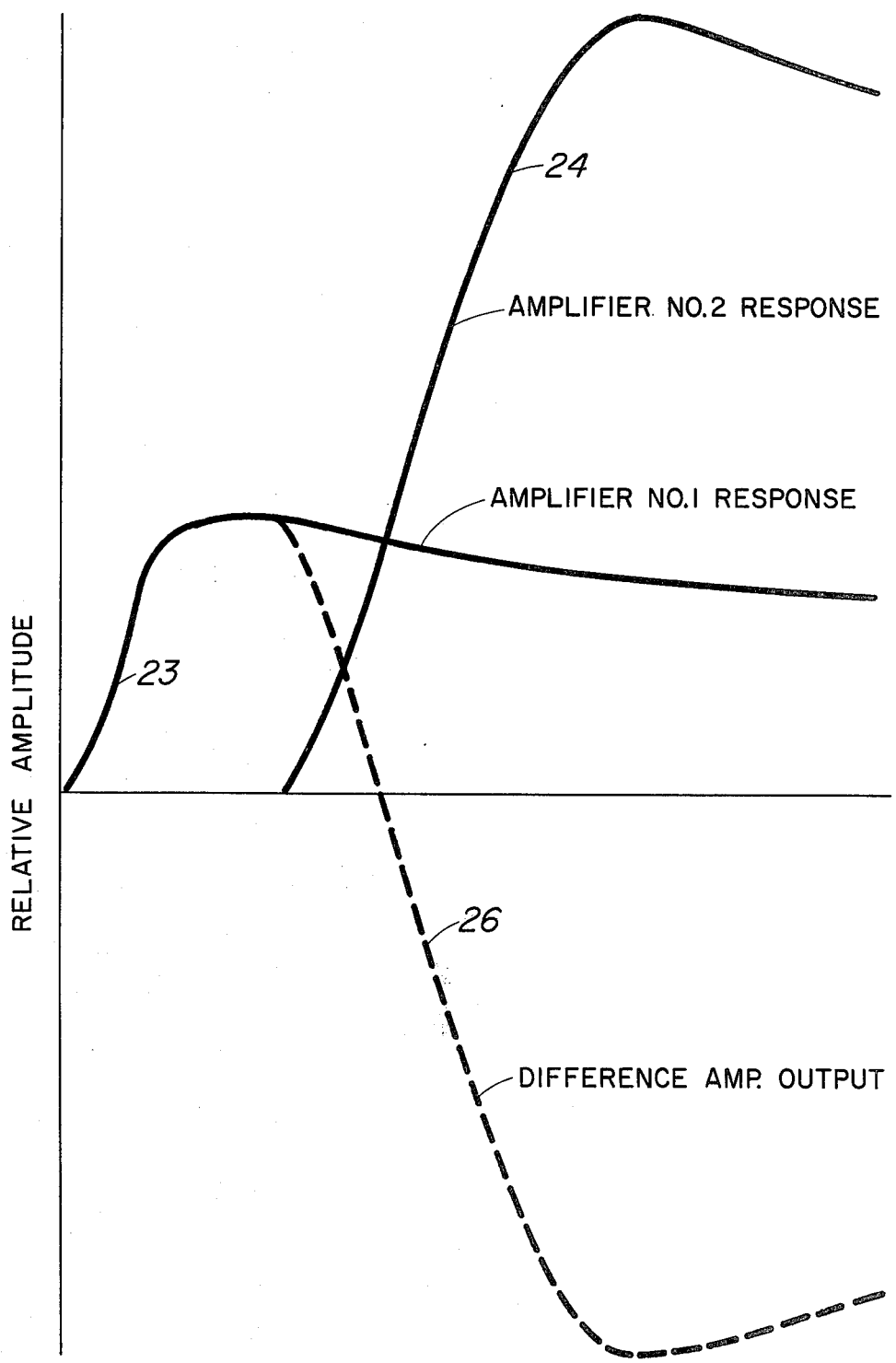
FIG. 3 is a diagram illustrating the relative amplitude of the integrated amplifier range response curves with the gain of the amplifiers unequal.
Figure 4:
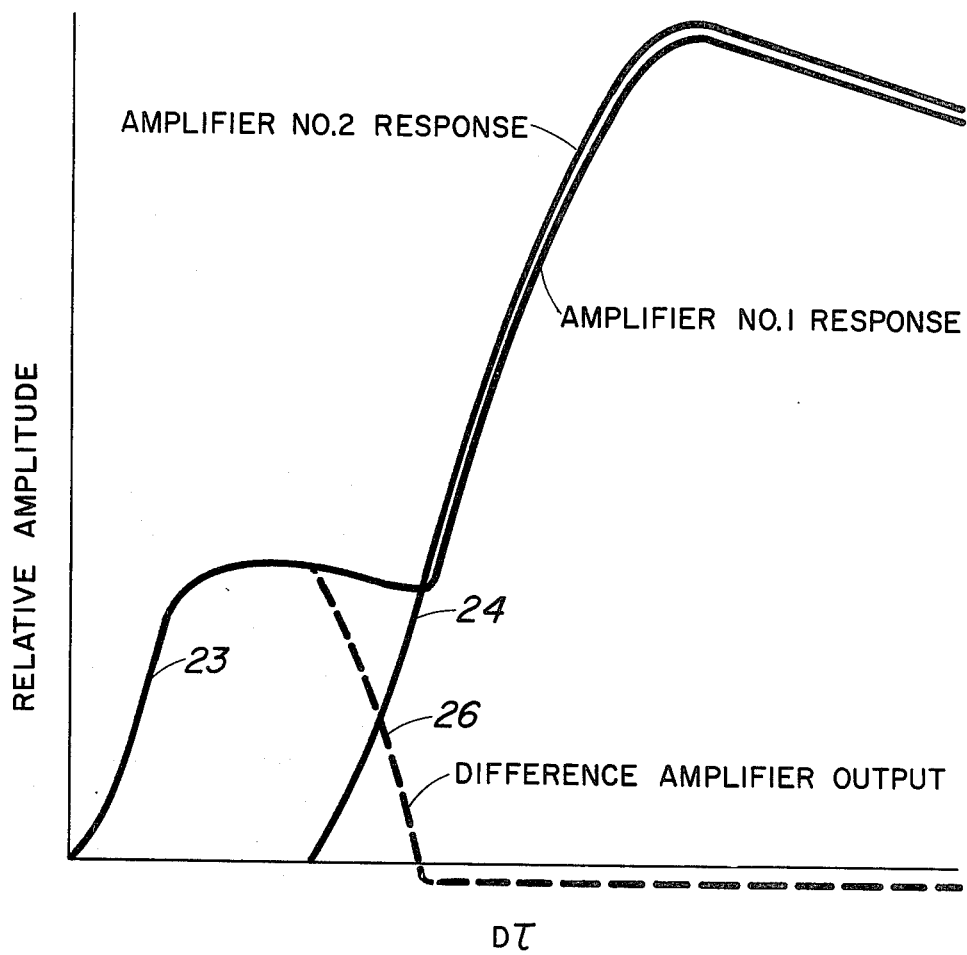
FIG. 4 is a diagram illustrating the response characteristics of the amplifiers having unequal gain but with an automatic gain control on one of the amplifiers.

With particular reference to FIGS. 2 through 4, FIG. 2 represents a plot of the envelopes 23 and 24 of the amplifiers 21 and 22 with the gain of the amplifiers being equal. The dash line 26 is the output from the difference amplifier 25 which is the range response of a system without an automatic gain control to give the absolute range cutoff as hereinafter described.

In FIG. 3 the two response curves or envelopes 23 and 24 and the range response curve 26 represent the output of the amplifier integrators 21 and 22 and the difference amplifier 25 respectively when the gain of amplifier 22 is approximately 12 db more than the gain of amplifier 21. When the gains are thus unequal the difference amplifier output 26 (i.e., the range response for the fuze system) is positive for in-range targets and negative for out-of-range targets. Therefore, by providing a firing circuit connected to the difference amplifier output which requires a positive signal to function an absolute range cutoff characteristic is obtained. A large reduction in sensitivity will occur for in-range target intercepts, however, in the presence of out-of-range reflectors (such as the sea) in such a system and operation against low level target intercepts will be seriously impaired.

In order to overcome this deficiency of reduction in sensitivity, an automatic gain feed back scheme is provided in the present system. The amplifiers are maintained at the unequal gain level as represented by the response in FIG. 3 whereby a negative output is obtained from the difference amplifier 25 for out-of-range targets. This negative output, and only the negative output, is fed back into the amplifier-integrator 21 circuitry via the hybrid automatic gain control (AGC) network 27 in such a manner as to increase the gain of amplifier-integrator 21 to nearly equal the gain of amplifier-integrator 22. The hybrid AGC network 27 applies the output from the difference amplifier 25 in such a manner to desirably and properly control the gain of amplifier-integrator 21. The resulting envelopes 23 and 24 of the amplifier-integrator outputs together with the difference amplifier range response 26 is shown in FIG. 4 when the AGC network is incorporated in the system and the gain in the amplifiers are unequal. This difference amplifier output is, therefore, a range response that is large and positibe for in-range targets and small and negative for out-of-range targets whereby an out-of-range target would increase the gain in amplifier integrator 21 sufficiently to overcome reduction in sensitivity to in-range targets due to RMS addition of in-range and out-of-range signals in the amplifier integrator 21. The present invention, therefore, attains an absolute range cutoff without a reduction in sensitivity when low level targets are intercepted. Also the counter-counter-measures characteristics of such a system is excellent since any electronic countermeasures energy will be spread across the entire mixer spectrum and will not give a firing signal output from the difference amplifier. Since the countermeasures energy is spread across the entire mixer spectrum by local oscillator noise, equal amounts of countermeasures signal energy will appear in amplifier-integrators 21 and 22. Since difference amplifier 25 has an output which is the difference of its input signals, the net effect of the equal energy added to each of the input signals to amplifier 25 would be zero.

Obviously many modifications and variations of the present invention are possible in the light of the above teachings. It is therefore to be understood that within the scope of the appended claims the invention may be practiced otherwise than as specifically described.

What is claimed:

1. A noise modulated FM fuze system comprising means for transmitting a signal frequency modulated by band limited noise, receiving means for receiving a return echo of said transmitted signal from a target, mixing means coupled to said transmitting and receiving means for producing an output signal which comprises bands of incoherent signals having different energy levels, first circuit means coupled to said mixer means for producing an output signal proportional to the energy level of a first of said band of incoherent signals, second circuit means coupled to said mixer means for producing an output signal proportional to the energy level of a second of said band of incoherent signals, and a difference amplifier coupled to said first and second circuit means for producing an output signal for activating the firing circuit of said fuze system when the difference in amplitudes of the outputs of said first and second circuit means is positive and of a predetermined amplitude.

2. An FM fuze system comprising a source of band limited noise, an RF transmitter coupled to a source of band limited noise for transmitting a random noise modulated signal in the direction of a target, receiving means for receiving a return echo of said transmitted signal, a mixer circuit having a first and second input coupled to said transmitter and to said receiving means for producing an output signal containing coherent and incoherent signals, first amplifier intergrator circuit means coupled to said mixer circuit means for accepting a first band of frequencies within said incoherent portion of said mixer output signal and producing an output voltage proportional to the average amplitude of said first band of frequencies, second amplifier intergrator circuit means coupled to said mixer circuit for accepting a second band of frequencies within said incoherent portion of said mixer output signal and producing an output voltage proportional to the average amplitude of said second band of frequencies, difference amplifier means coupled to said first and second circuit means for producing an output signal proportional to the difference of the amplitudes of the output signals of said first and second amplifier integrator circuits.

* * * * *